United States Patent [19]
Listou

[11] Patent Number: 6,134,564
[45] Date of Patent: Oct. 17, 2000

[54] COMPUTER PROGRAM FOR RAPIDLY CREATING AND ALTERING PRESENTATION OF PARAMETRIC TEXT DATA OBJECTS AND ASSOCIATED GRAPHIC IMAGES

[75] Inventor: Robert Listou, Washington, D.C.

[73] Assignee: ExecWare, Inc., Washington, D.C.

[21] Appl. No.: 09/325,358

[22] Filed: Jun. 4, 1999

Related U.S. Application Data

[63] Continuation-in-part of application No. 08/561,178, Nov. 20, 1995.
[51] Int. Cl.$^7$ ................................................. G06F 7/08
[52] U.S. Cl. ............................................ 707/505; 707/526
[58] Field of Search ................................ 707/503, 504, 707/505, 509, 526, 529

[56] References Cited

PUBLICATIONS

Microsoft (R) Windows NT(R) Version 4.0, 1996, screen printouts pp. 1–4.
Simpson, Mastering WordPerfect 5.1 & 5.2 for Windows, Sybex Corporation, 1993, pp. 586–593.

*Primary Examiner*—Stephen S. Hong

[57] ABSTRACT

An apparatus, method and article of manufacture of the present invention provide the ability to rapidly format and reformat tabular displays, organized according to the preferences of the user, of records or text data objects that may have associated graphic images and/or audio files. The invention provides simplified, interactive means for naming categories or parameters associated with each text data object, for assigning values to each parameter for each text data object, for associating graphic images and/or audio files with each text data object, and for constructing a sort order for displaying a list of selected text data objects. The features of the present invention allow a user, without need for specialized training or a user manual, to rapidly view the same or different lists of text data objects from differing perspectives, without cumbersome steps that could interrupt the user's line of thought. The present invention allows the user to then view graphic images associated with individual text data objects and hear associated audio files. The present invention has application to any situation that will benefit from the systematic planning, monitoring, and/or analysis of a plurality of text data objects and associated visual and aural information.

3 Claims, 13 Drawing Sheets

| | | | View Query | | | | | | | |
|---|---|---|---|---|---|---|---|---|---|---|
| Add | Edit | Delete | Print Table | Print Marked | Mark | Mark All | Unmark All | Close | Calendar | Exit | Help |

| Mark? | Links? | Type | Material | Grid | Color | Item |
|---|---|---|---|---|---|---|
| | | Pitcher | Bronze | A9 | Bronze | 7 |
| | | Pitcher | Clay | A8 | Blue | 5 |
| | | Pitcher | Clay | C14 | Blue | 87 |
| | | Pitcher | Clay | G1 | Blue | 230 |
| | ∞ | Pitcher | Clay | A7 | Brown | 1 |
| | | Pitcher | Clay | C13 | Brown | 121 |

Fig. 11

COMPUTER PROGRAM FOR RAPIDLY CREATING AND ALTERING PRESENTATION OF PARAMETRIC TEXT DATA OBJECTS AND ASSOCIATED GRAPHIC IMAGES

This is a continuation-in-part of application Ser. No. 08/561,178 filed Nov. 20, 1995.

BACKGROUND OF THE INVENTION

The basic invention is unchanged but the design is improved. An addition to the design substantiates a change of the title so it accurately describes the improved invention.

This invention relates generally to the field of information processing and display by computers and, more particularly, to a computer-implemented method for sorting and displaying text data objects that permits rapid re-sorting and re-formatting of displayed text data objects and perceiving associated graphic images and audio files.

DESCRIPTION OF THE RELEVANT ART

Database management systems today generally provide for the creation, storage, and display of large quantities of both numeric and text data as well as graphic images. For example, a company may maintain a database of employee payroll records. In such a database, a series of payroll checks to Jane Doe may be stored as a large number of records, all with identical data elements or parameters such as name, employee number, address, Social Security Account Number, gross pay, along with a unique date. And perhaps a graphic image depicting the person's face. An operator of the database can design tables that display selected records as rows with the columns of data parameters arranged in a particular desired order. Mathematical operations can typically be performed on columns containing numeric data. However, the relationships between and among the data parameters of such a table may not be readily apparent. Typically, the purpose for reviewing such a table is to ascertain that all desired records are listed and that each record appears complete.

In the existing art, tabular displays of records can be designed as desired. However, if examination of a table suggests a change in a record or consideration of a different table format, the user must usually interrupt his or her current line of thought. Tabular data displays are seldom designed by those who will employ them for drawing conclusions, and seldom does the user of a table have ready ability to manipulate the database in order to reformat or rearrange the table. If a record needs to be changed or a new table format is desired, it may take considerable time to produce a table reflecting the changes. Even if the user is the operator of the database management system, time will be required and the user's current line of analytic reasoning may be lost.

Existing electronic spreadsheet programs, such as Lotus 1-2-3™ and Microsoft EXCEL™, can also involve text and numeric data arranged in tabular form. Typically, each row in a table concerns a unique subject, and the cells making up the row contain textual or numerical data setting forth parameters or characteristics of the subject. For example, a row might represent a record concerning a particular city, and the cells would include text and numeric data that can be used in computations such as population, area, or number of schools. Formulas can be entered into cells of the spreadsheet so that data can be aggregated or otherwise manipulated. For instance, in a table listing population data for cities, a spreadsheet typically could provide a total of the population figures for selected cities. Current art also enables the operators of some spreadsheets to create three-dimensional graphs of numbers displayed in the spreadsheet, with each axis of the graph representing one of the parameters listed in the same row as the numbers. If there are more than three parameters, the operator can create several graphs with varying dimensions. Analysis of several such graphs can disclose relationships that cannot be perceived by looking at a single graph. The operator can usually, upon viewing a spreadsheet, relocate columns and rows. The operator cannot, however, easily and quickly revise the contents of a row; and spreadsheets typically do not have the capability to search for records rapidly.

Thus, while computer database management systems and spreadsheet programs with data-sorting capability have been widely available, existing systems and programs for sorting data may not adequately serve the needs of some users, especially those without specialized training or experience attempting quickly to discern relationships between and among elements in large sets of data. Existing programs typically focus on presenting the data, rather than on providing the ability rapidly to draw conclusions from the data by rearranging it to perceive relationships that are not apparent on a static table. Other tables are used to select individual records with which images are associated, or to view images to access related text data. There are no means to view and analyze sets of data, both the textual parameters of records and associated graphic images, in a way that gives the user the ability to immediately manipulate (model) the data.

Frequently, in existing programs, it is not possible to select different sort parameters and differing subsets of the data without a series of precisely-specified steps that can frustrate a user interested in quickly pursuing many varying lines of thought. Often, operation of such programs requires substantial training, familiarity with user manuals and, in some cases, specialized personnel.

The present invention derives from the observation that individuals who must draw conclusions from tables of text data objects and associated graphic images and/or audio files have needs not met by currently-available database management systems and spreadsheet programs. An individual's analysis occurs in the context of the broader range of knowledge and experience that he or she brings to the situation. Accordingly, this analysis will be enhanced by exercising personal control of the format of the presentation of text data objects and associated graphic images and/or audio files. Users of databases need more than the ability to influence the design of the tables; they need the ability to relate interactively with the tables to quickly revise the format to match the rapid, complex and intuitive probing of the thought process. In particular, users of databases need interactive capabilities (1) to change parameter values of individual text data objects contained in a table and to immediately see how that change affects the location of text data objects in the table; (2) to add or delete text data objects and immediately to see the results; and (3) to reformat tables displaying text data objects. Because these capabilities enable users quickly to perceive relationships between objects in several ways, analysis of individual text data objects as well as entire databases of text data objects and associated graphic images and audio files can be enhanced. Perceiving those relationships rapidly, and in the context of related data, the associative ability, and intuition in the user's mind (including those generated during the processing) is at the heart of the invention. The name given to that cognitive process by the applicant is contextual data modeling. It has application in any situation involving planning, monitoring, and/or analysis of a large population of text data objects.

OBJECTS AND SUMMARY OF INVENTION

The subject of the present invention is the display of a columnar list, or table, of text data objects on a suitable device controlled by a computer, such as a monitor. In this invention, a text data object is an item, such as a text record, to which parameters have been associated and to which graphic images and/or audio files may be associated.

The principal object of the present invention is enabling persons who draw conclusions from the table of text data objects to personally and rapidly reformat the table in order to perceive a plurality of relationships between the displayed values of the parameters. Analyzing relationships between those non-numeric values by reformatting the table is analogous to analyzing relationships between numeric values in database records by creating graphs. In this invention reformat means change appearance or change contents.

Another object of the invention is to provide a simplified method for a user to select text data objects to be sorted and for choosing the format of a table for displaying the sorted text data objects.

Another object of the invention is to provide a method for the user to perceive graphic images associated with text data objects as part of the user's analysis of the displayed table of text data objects. Similarly, listening to associated audio files becomes part of the analytic process.

According to the present invention, as broadly described herein, a method is provided to display on a computer controlled display device, such as a monitor, a Build Query dialog box in which appears a plurality of names of parameters that have previously been assigned and associated with text data objects. Further according to the present invention, the user is permitted to view possible values that have previously been assigned to each parameter, choose them or enter new values to select text data objects, and designate the sort order. In this invention select means specify which parameters and associated values the computer system is to satisfy in retrieving text data objects from the database for display on the table, and sort order means the order in which the columns of parameter values will appear on the table.

Further according to the present invention, the user viewing the table may quickly return to the Build Query dialog box to select a different set or subset of text data objects and/or revise the sort order. The invention allows the user to format and re-format the table, within seconds, to perceive values of text data objects from many different perspectives.

Another object of the present invention is permitting the user to rapidly change the parameter values of text data objects displayed on the table and immediately see on the table the re-sorted results of such parameter value changes.

Another object of the present invention is permitting the user viewing the table to rapidly add text data objects to it and immediately see on the table the re-sorted results of the expanded table.

Another object of the present invention is permitting the user to rapidly view a plurality of tables of text data objects with all possible arrangements of the columns of parameter values.

According to the present invention, there is stored in the computer system a static pattern that defines all possible arrangements of the columns of parameter values. When the computer system uses that pattern, either manually or automatically at a speed determined by the user, to control the successive display of tables it is apparent that all possible arrangements of columns are in fact available to the user, an important feature because of the large numbers of possible arrangements (24 with 4 parameters, 120 with 5 parameters, and 720 with 6 parameters).

Also, according to the present invention, a computer system comprising means for effectuating the method of the present invention is provided. Further according to the present invention, computer-readable memory encoded with a program directing a computer system to effectuate the method of the present invention is also provided.

Additional objects and advantages of the invention are set forth in part in the description that follows, and in part are obvious from the description, or may be learned by practice of the invention. The objects and advantages of the invention may also be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate particular embodiments of the invention, and together with the description, serve to explain the principles of the invention.

This Continuation-In-Part application presents drawings and Detailed Description that illustrate the original invention and also the improvements. One improvement is the automatic display of various tables of selected text data objects to facilitate the viewing of large numbers of arrangements of the columns of parametric values included in those tables. Another improvement is associating graphic images and audio files with text data objects so that they can be viewed, or hear, as part of the process of modeling tables of text data objects.

FIG. 11 is an illustration of a display screen showing an exemplary table as may be displayed and used in an illustrative embodiment.

DETAILED DESCRIPTION OF THE PREFERRED EMBODIMENTS

Figure 1:
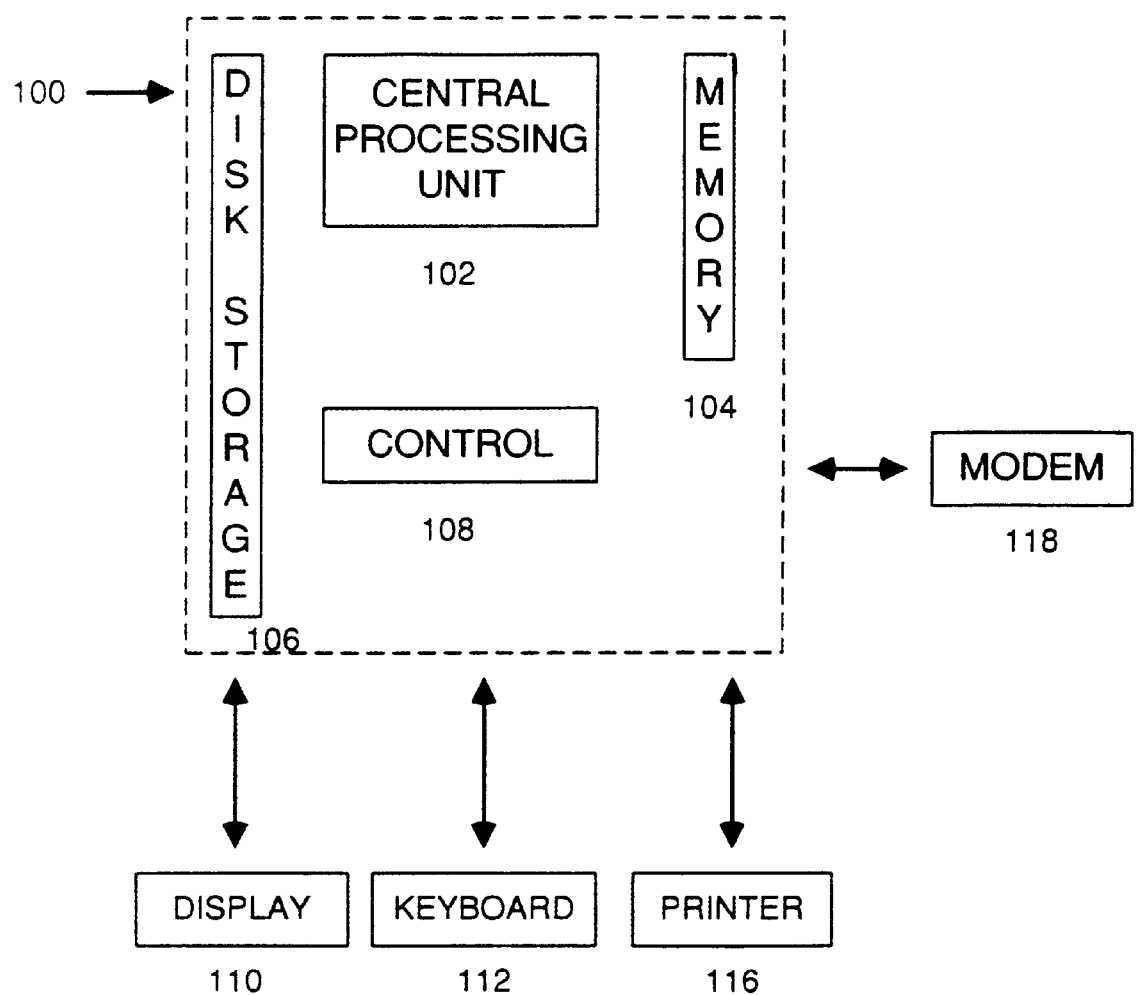
FIG. 1 is a block diagram of a computer system as may be utilized by the present invention.

A computer system as may implement and execute the present invention is described with reference to FIG. 1. Such a computer system generally may comprise a processing means (102), such as a central processing unit (CPU), for processing information; a memory (104) for storing information and instructions for the processor, preferably including a dynamic storage means (such as random access memory (RAM)) and a static storage means (such as read-only memory (ROM)); a data storage device (106) such as a magnetic disk and disk drive for storing information and instructions; a control means (108) for controlling input/output operations and the interaction between the processor (102) and the memory; a display device (110) such as a cathode ray tube or liquid crystal display for displaying a cursor and information to the computer user; an alphanumeric input device (112), such as a keyboard, including alphanumeric and other keys for communicating information and command selections to the processor (102); and a cursor control device (114), such as a point-and-click mouse device, trackball, joystick, or light pen, for communicating information and command selections to the processor (102) and for controlling cursor movement. It is useful if the system includes a hard copy device (116), such as a printer, for providing permanent copies of information. Finally, the system may include a modem (118) for communicating with computer systems at remote locations.

Figure 2:
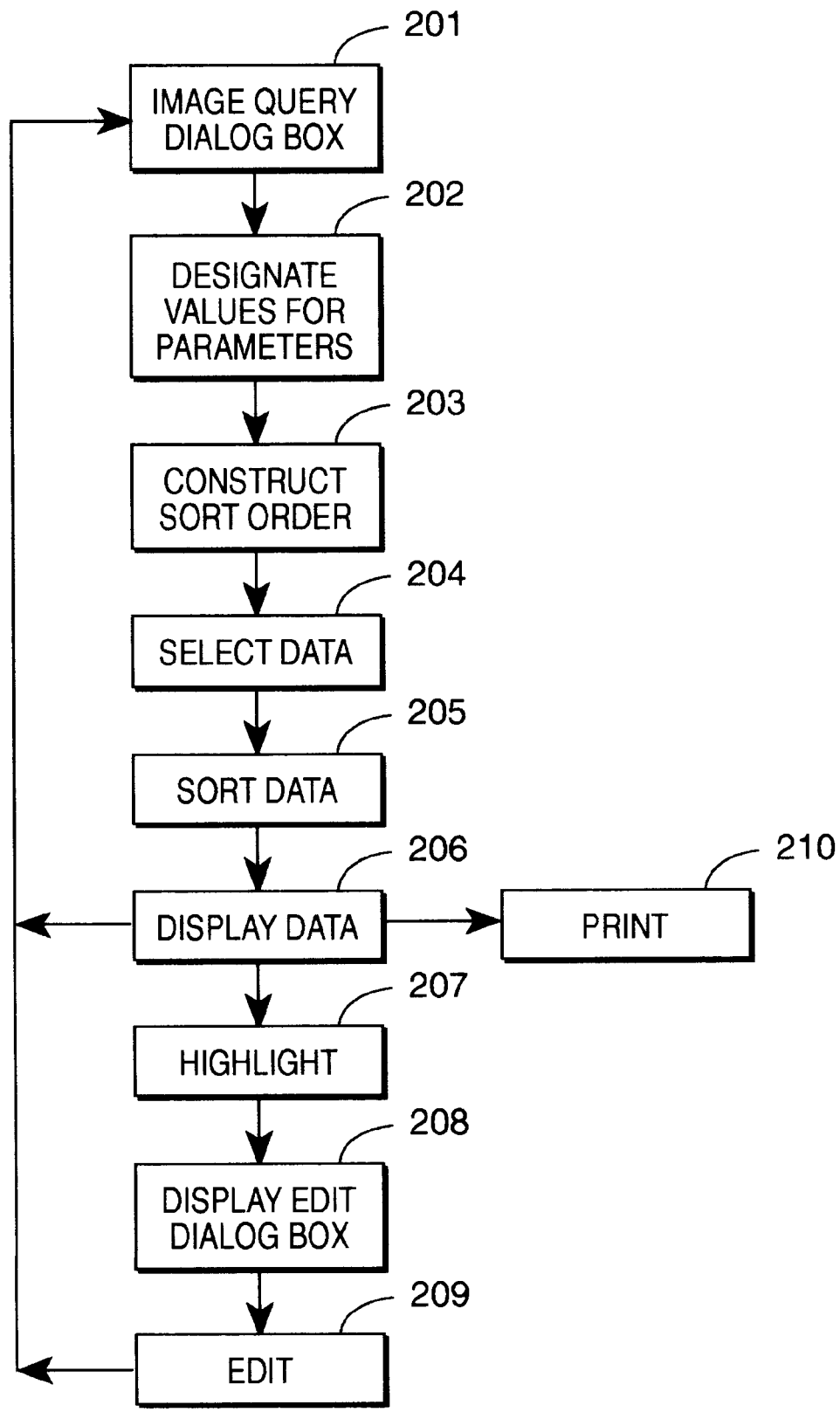
FIG. 2 is a flow diagram showing the overall operation of the present invention.

FIG. 2 is a flow diagram depicting the overall operation of the invention. While the invention can be practiced in a manner different from that depicted in the flow diagram, the flow diagram provides a useful overview for understanding the invention.

The invention involves, among other things, the use of a computer system, such as depicted in FIG. 1, to sort and display text data objects stored in the computer system. As shown in FIG. 2, the invention comprises the steps of imaging a query dialog box on a display device controlled by the computer system, with the query dialog box displaying parameters associated with each of the text data objects, spaces for listing the values associated with each parameter and a list of parameters for selecting a sort order (201); designating at least one value listed in the query dialog box for each of the parameters displayed in the query dialog box (202); constructing a sort order from a list of parameters displayed in the query dialog box (203); using the computer system to select the text data objects satisfying the designated values (204); and using the computer system to sort the selected text data objects satisfying the designated values (205). Also depicted are the subsequent steps of displaying the sorted data (206); highlighting text data objects (207); displaying an edit dialog box (208); and editing the highlighted text data object (209). Depicted also is the step of printing (210).

In a preferred embodiment the computer system is equipped with Windows™ software and suitable display and point-and-click mouse devices well known in the art to enable a user to signal the computer system using the point-and-click mouse device. The several steps depicted in the flow diagram of FIG. 2 requiring user input are preferably accomplished by a user of the computer system signaling the system through the use of a point-and-click device, such as a mouse. The steps required to program a computer system to accept suitable signaling and to display the screens depicted in FIGS. 3–12 are well known to one of ordinary skill in programming for Windows™ applications.

This invention is described herein with reference to analyzing archaeological data. Other potential uses include criminal investigation, historical analysis, and any other situation warranting systematic planning, monitoring, and/or analysis of a plurality of text data objects and associated graphic images and/or audio files.

Figure 3:
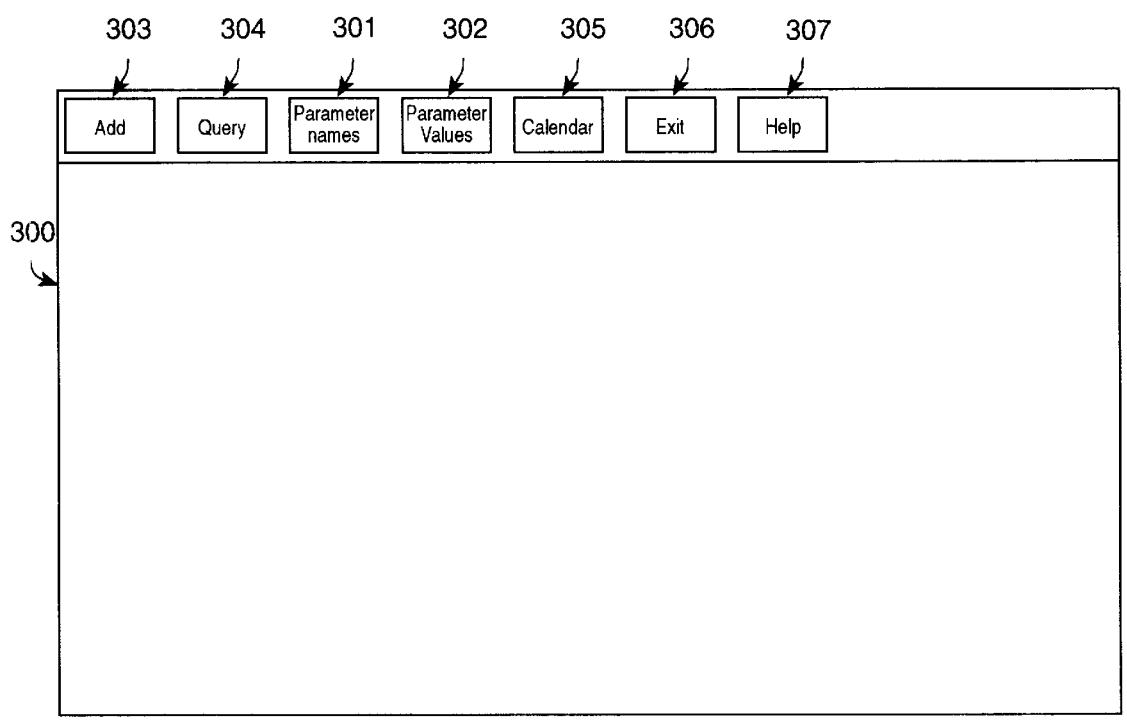
FIG. 3 is an illustration of a display screen showing an exemplary opening display for a computer program in accordance with the present invention.

FIG. 3 is a depiction of an exemplary menu screen (300) that appears when the user begins each use of a preferred embodiment of the present invention. From this menu screen, the user has the option of calling up screens that will allow her to implement the invention. Thus, clicking on "Parameter Names" (301) calls up the display screen depicted in FIG. 4, which in turn permits the user to assign parameter names and types. Clicking on "Parameter Values" (302) calls up the display screen depicted in FIG. 5, which permits the user to assign values to parameters. Clicking on "Add" (303) calls up the display screen depicted in FIG. 6, which permits the user to create text data objects, assign parameter values to the text data objects, and to create links between text data objects. Clicking on "Query" (304) calls up the display screen depicted in FIG. 7, which permits the user to construct a query that will determine the format of the table to be examined.

The "Calendar," "Exit," and "Help," functions depicted in FIG. 3 are well known in the art. Clicking on "Calendar" (305) calls up a calendar that preferably spans an entire century. Clicking on "Exit" (306) initiates the process of exiting the computer program. Finally, clicking on "Help" (307) gives the user access to the help program associated with the invention.

In a alternative embodiment the display screen illustrated on FIG. 3 will allow the user to select one of several databases for current operations. Thus, for example, an archeologist can have a separate database for each archeological dig, and a detective can have a separate database for each criminal case.

Figure 4:
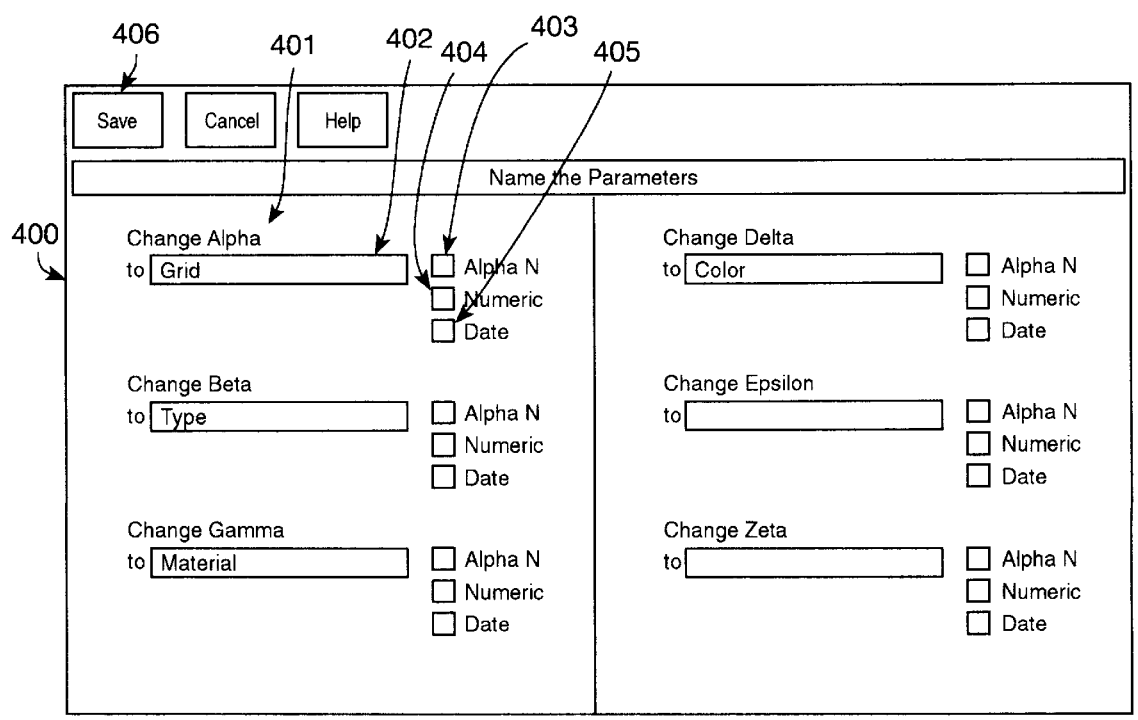
FIG. 4 is an illustration of a display screen showing an exemplary dialog box for choosing parameter names and types.

FIG. 4 is an illustration of a display screen showing an exemplary dialog box (400) for choosing parameter names and types. In a preferred embodiment, default parameter names are Greek letters, such as Alpha-Zeta depicted in FIG. 4. Thus, the first-listed parameter carries the default name "Alpha" (401). Under each parameter name, a space (402) is provided for entering a new name for the parameter. As depicted on FIG. 4, the user can specify whether the parameter is an alphanumeric parameter, a numeric parameter, or a date parameter. Thus, clicking on "Alpha N" (403) specifies an alphanumeric parameter; clicking on "Numeric" (404) specifies a numeric parameter; and clicking on "Date" (405) specifies that a date is to be entered as the parameter value. Clicking "Save" (406) saves the parameter names, types, and operations selected, and signals the computer to display the "Enter Parameter Values" dialog box depicted in FIG. 5.

Figure 5:
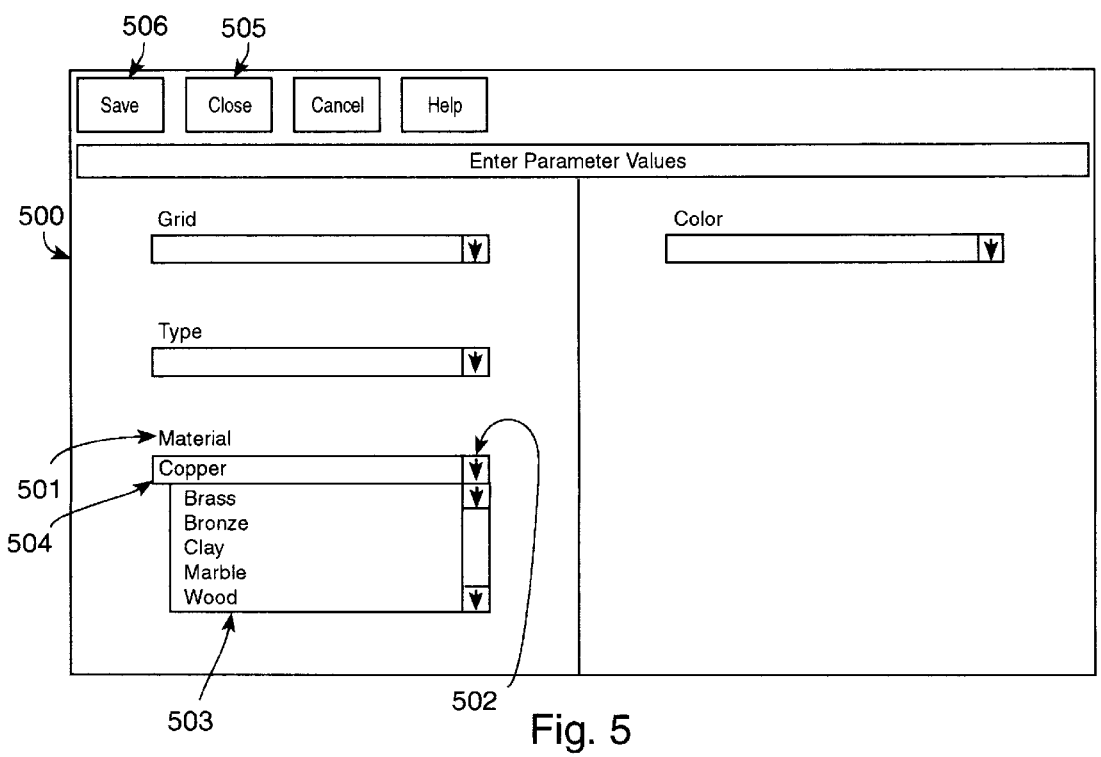
FIG. 5 is an illustration of a display screen showing an exemplary dialog box for assigning values to parameters.

FIG. 5 is an illustration of a display screen showing an exemplary dialog box (500) for assigning values to parameters. As depicted in FIG. 5, parameters that have not been assigned values are not displayed at all. In an alternative preferred embodiment, parameters that have not been assigned names carry their default names. As shown in FIG. 5, the first four parameters carry the names that were assigned to the parameters when "Save" was clicked on the display screen depicted in FIG. 4. Thus, for example, the third parameter is now named "Material" (501).

In FIG. 5, clicking arrow (502) adjacent parameter value space (504) causes the computer system to display pull-down menu (503) below parameter value space (504). Pull-down menu (503) displays the values that have been assigned to a parameter. For example, in FIG. 5, pull-down menu (503) indicates that the alphanumeric parameter "Material" (501) has been assigned values "Brass," "Bronze," "Clay," "Marble," and "Wood." In parameter value space (504), the user has typed "Copper" to be entered as an additional parameter value. Clicking "Save" adds "Copper" to the list of values for the "Material" parameters, and the list is automatically resorted alphabetically and displayed in pull-down menu (503).

In a preferred embodiment, clicking "Close" (505) also saves the entered parameter values and signals the computer to close the Enter Parameter Values dialog box (500) and displays the screen depicted in FIG. 3. From the screen depicted in FIG. 3, the user can then call up the Add Items dialog box (600) depicted in FIG. 6 by clicking "Add" (303). In an alternative preferred embodiment, means are provided that enable the user to call up the Add Items dialog box (600) directly from the Enter Parameter Values dialog box (500).

Figure 6:
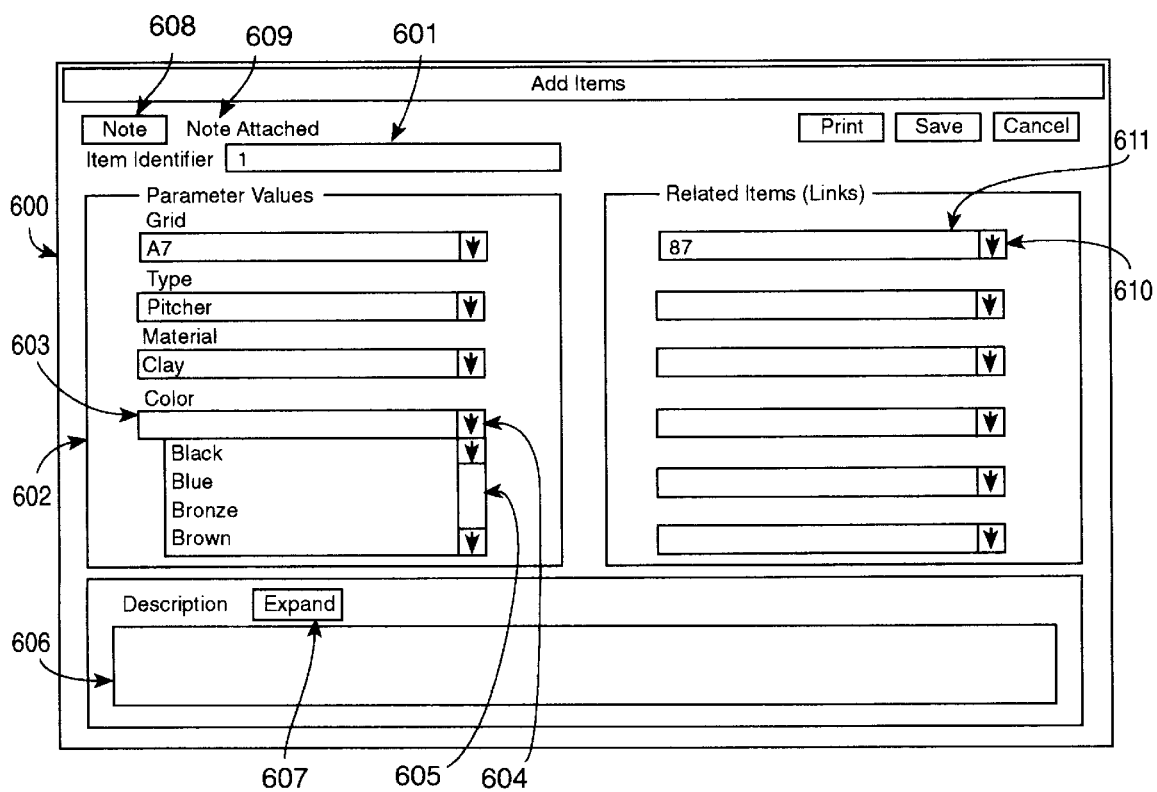
FIG. 6 is an illustration of a display screen showing an exemplary dialog box for creating text data objects with associated parameter values and images.

The Add Items dialog box (600) depicted in FIG. 6 prompts the user to enter information relating to the different text data objects that comprise the database. For purposes of FIG. 6, each text data object constitutes an "item," which can be described by a set of parameter values. The dialog box prompts the user first to enter an identifier for the item in the space (601) adjacent the words "Item Identifier." In the dialog box depicted in FIG. 6, the user has entered "1" as the item identifier. In a preferred embodiment, the item identifier can be any mix of alphanumeric characters.

The user assigns parameter values to the item using Parameter Values dialog box (602). Parameter Values dialog box (602) lists the parameters and provides a parameter value space (603) under each parameter name for assigning a parameter value to the item. Clicking arrow (604) adjacent to parameter value space (603) under a given parameter displays a pull-down menu (605) listing the values associated with that parameter. In the example depicted in FIG. 6, the user clicked arrow (604) adjacent parameter value space (603) for the "Color" parameter to signal the computer to display pull-down menu (605) providing a list of colors to choose from. Clicking on a color from pull-down menu (605) causes that color to be displayed in space (603) below the color parameter name as the value of the color parameter for Item 1. If the parameter has numeric values, arrow (604) is absent or inoperative and the number value for the item can be directly entered in parameter value space (603). If the parameter is a date, arrow (604) is absent or inoperative and parameter value space (603) contains the symbols "MM/DD/YYYY", thereby prompting the user to enter the date in the proper format.

As depicted in FIG. 6, in a preferred embodiment, after assigning parameter values for an item the user can add a description (606) of the item. Clicking on space (606) allows the user to type a description in space (606). In a preferred embodiment, the length of the description has no fixed limit, and if it exceeds the space provided by text space (606), the user can click "Expand" (607) to view a full-screen scrollable dialog box that displays the entire description. In a preferred embodiment, the description can include embedded graphic or audio files containing, for example, photographs, drawings, or sounds associated with the items to be studied. In an alternative preferred embodiment an additional button, not depicted, similar to (607) and labeled, Graphics, for example, would cause the display a dialog box into which can be listed the file identification of a plurality of graphic images; and a similar provision would be provided for audio files.

In a preferred embodiment, clicking "Note" (608) signals the computer system to display a small space into which a brief note can be entered. If a note has been entered in this manner, the phrase "Note Attached" (609) is displayed, as depicted in FIG. 6. The "Note attached" function thus serves the same purpose as a Post-It™ or tape flag, to alert the user of a brief comment relating to the item.

If the user wishes to establish a link between the item for which data is being entered and another item, clicking the down arrow at (610) displays a pull-down menu displaying all the items in the database, from which the user can select a linked item by clicking on it in the pull-down menu. Clicking on an item in the pull-down menu causes it to be displayed in space (611) as a related item or "link." Clicking on the item in space (611) causes the computer system to display an Edit dialog box, such as that depicted in FIG. 9, for the linked item.

Figure 7:
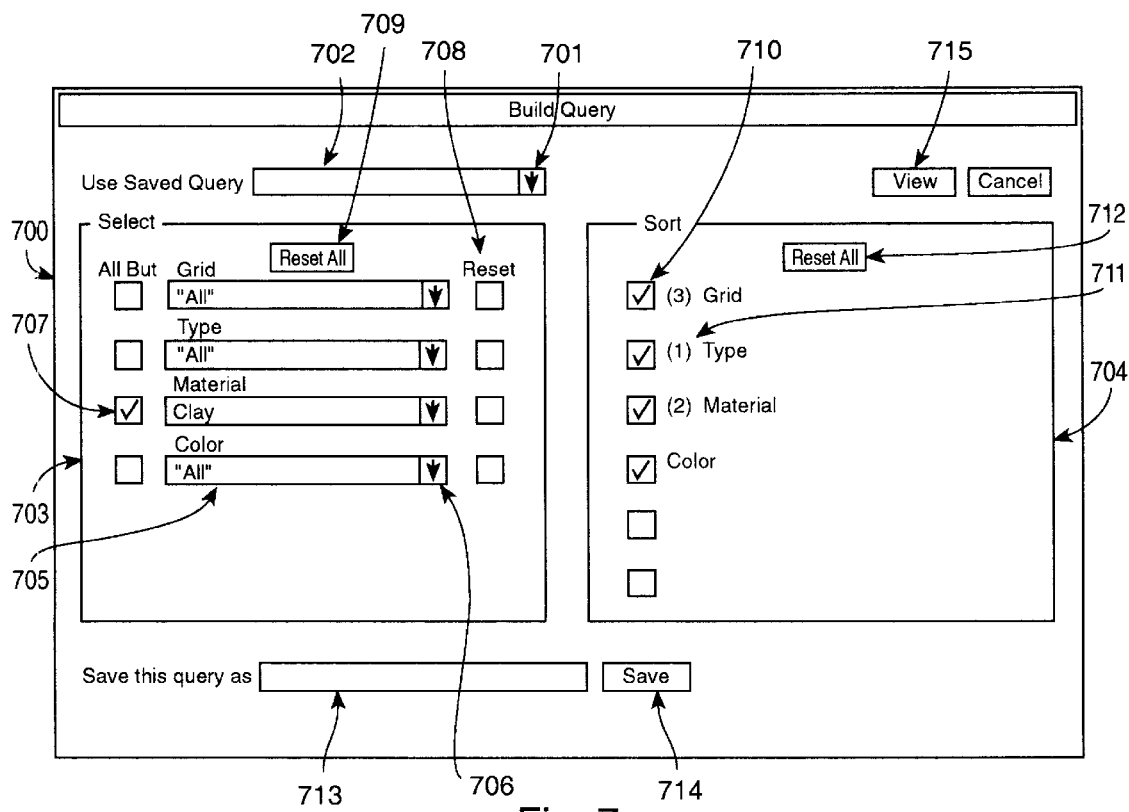
FIG. 7 is an illustration of a display screen showing an exemplary dialog box for constructing a query.

FIG. 7 depicts a screen displaying an exemplary Build Query dialog box (700). Build Query dialog box (700) permits the user to choose, according to his or her needs or interests, the perspective from which to view the items in the database. Clicking on arrow (701) adjacent Use Saved Query space (702) signals the computer system to display to the user a list of queries that have been previously constructed and saved, and permits the user to query the database using such a saved query.

As depicted in FIG. 7, in a preferred embodiment of this invention, the Build Query dialog box (700) includes a "Select" dialog box (703) and a "Sort" dialog box (704). In Select dialog box (703), the user selects parameter values for the text data objects to be displayed. In the illustrative examples of FIG. 7, each parameter has a space (705) below it, with an arrow (706) adjacent to the space. For an alphanumeric parameter, clicking on arrow (706) signals the computer to display a pull-down menu listing all possible values for that parameter. Using well-known Windows™ procedures, the user can select one, all, or several of the parameter values.

For a numeric parameter, the user can enter the parameter value directly into space (705), in the form of a range, a single number, or using the greater than (">") or less than ("<") operators in conjunction with a number. For a numeric parameter, clicking arrow (706) signals the computer to display a mathematical operations dialog box (not depicted). The mathematical operations dialog box allows the user to select, using well-known Windows™ procedures, the type of mathematical operation to be performed by the computer and displayed on FIG. 8. In a preferred embodiment, the user can select "total," "average," "standard deviation," or a formula input by the user.

For a date parameter, clicking arrow (706) signals the computer to display a dialog box (not shown) with four choices: "On," "On and Before," "On and After," and "Between." Clicking one of the first three choices causes the clicked word or phrase to appear in space (705) adjacent the symbols "MM/DD/YYYY". The user then can type the desired date over the symbols. Clicking the "Between"

choice causes space (705) to display "MM/DD/YYYY Between MM/DD/YYYY," thereby prompting the user to enter a range of dates.

In a preferred embodiment, the depicted default value of "All" in space (705) blank causes all possible values for the parameter to be selected. In a preferred embodiment, the user also has the option of clicking on "All but" box (707), which causes all parameter values other than those selected to be processed. In the preferred embodiment depicted in FIG. 7, clicking on reset box (708) for a given parameter removes any values selected for that parameter from space (705), and clicking "reset all" box (709) removes all entered parameter values for all the parameters.

The user specifies the desired sort order, by parameter, in Sort dialog box (704). To select a sort order, the user clicks the boxes (710) adjacent the parameter names in the desired order. In the embodiment depicted in FIG. 7, the selected sort order is indicated by the parenthetical numerals (711) adjacent to the parameter names. The absence of such a parenthetical numeral indicates that that parameter has not been included in the sort order. The order can be reset, if desired, by again clicking individual choice boxes (710) or by clicking "Reset All" box (712).

Clicking "Save this query as" space (713) permits the user to enter a name for the query, and clicking "save" (714) stores the query. The query can later be accessed using Use Saved Query space (701).

Figure 8:
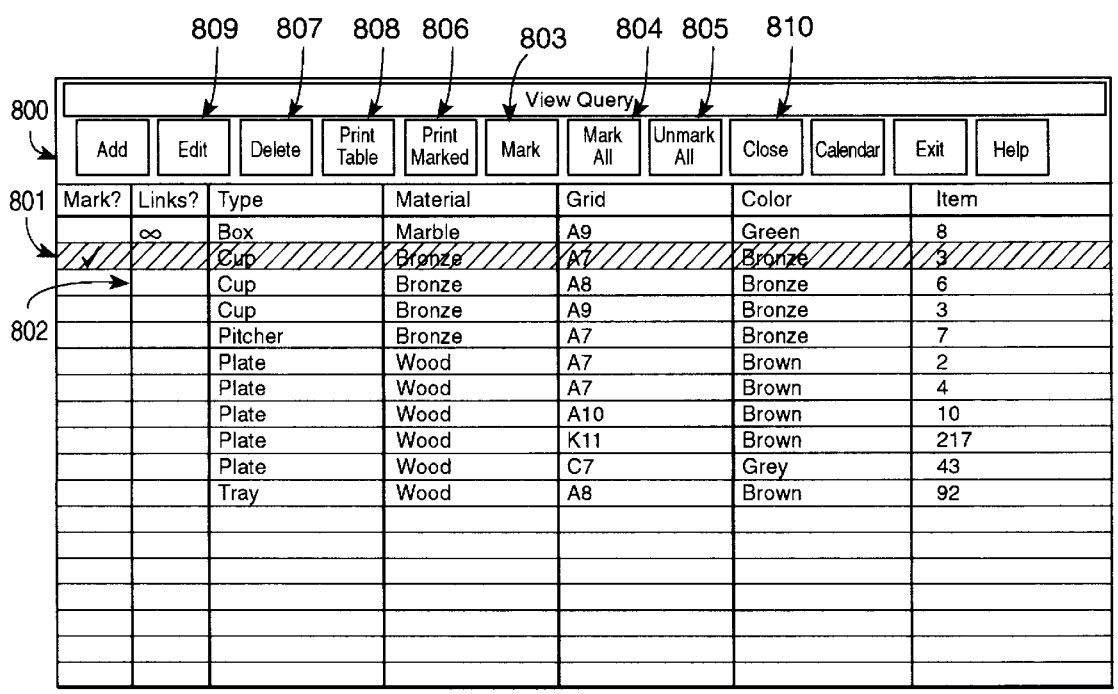
FIG. 8 is an illustration of a display screen showing an exemplary table as may be displayed and used in an illustrative embodiment.
Figure 9:
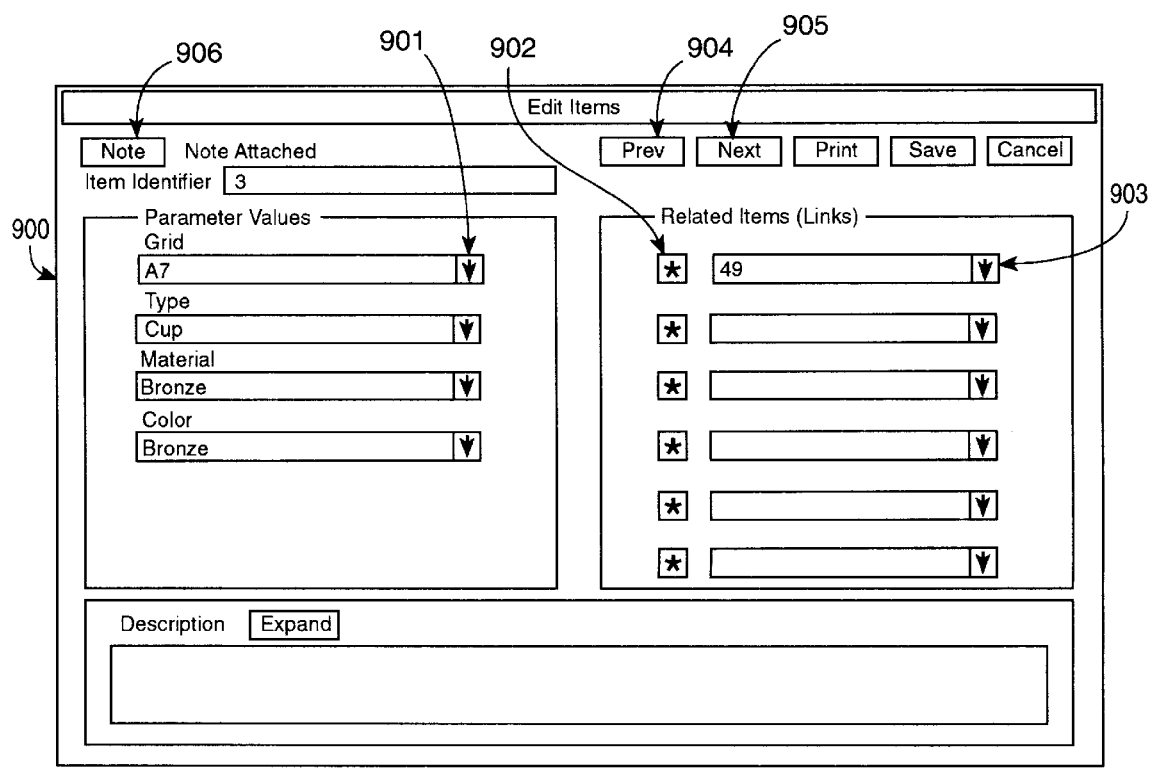
FIG. 9 is an illustration of a display screen showing an exemplary Edit dialog box for revising and adding information related to a text data object.

When the user has completed building the query, the result is displayed by clicking "View" (715), which causes the computer to display a table such as that shown in the View Query screen depicted in FIG. 8. Thus, clicking "View" (715) signals the computer system to process the data, selecting those items that meet the stated criteria and arranging the parameters in the order specified by the query. As shown in FIG. 8, the columns of parameter data are displayed to the left of the items they define. This is because the object of the invention is to perceive relationships between the items by logically sorting the items in various arrays; the item identifications have no function in the computer process although they may in the human process of analyzing the array of data. If a displayed parameter is numeric, permitting mathematical operations, the computer will display, at the last row of that column, the result of the math operation specified on FIG. 6.

In the preferred embodiment depicted in FIG. 8, "Mark?" column (801) serves to indicate whether a row corresponding to an item has been designated for further operations, such as printing or deleting. The "Links?" column (802) indicates whether a link has been created between a given item and any other item in the database. In the illustrative example depicted in FIG. 8, the user has previously highlighted the second row (corresponding to Item 3), and clicked "Mark" (803) on the tool bar, thereby causing a checkmark to appear in the second row in "Mark?" column (801). Clicking "Mark All" (804) causes all the rows to be marked; whereas clicking "Unmark All" (805) causes marks to be removed from all the rows. In the preferred embodiment depicted in FIG. 8, clicking "Print Marked" (806) causes all marked items to be printed. In a preferred embodiment, "Delete" button (807) can be used to delete a single highlighted row or a group of marked rows, at the user's option. In the preferred embodiment depicted in FIG. 8, clicking "Print Table" button (808) provides the user the option of printing the displayed table or saving the table to a disk for later use in documents or e-mail. Similarly, clicking "Print Marked" button (806) provides the user the option of printing only the marked items from the displayed table or saving the marked items from the table to a disk for later use in documents or e-mail. Clicking the "Close" (810) button causes the computer to again display the Build Query dialog box illustrated in FIG. 7.

In the illustrative example depicted in FIG. 8, the second row is highlighted. A double click on this row, or a single click on "Edit" button (809) in the tool bar, calls up Edit dialog box (900) depicted in FIG. 9. Using the Edit dialog box (900), the user can study and alter the description of Item 3 and can also study the information pertaining to linked Item 49. Thus, clicking the arrow (901) adjacent to the display of values for the parameter named (Grid) causes the display of a pull-down menu of all selected values, so that a new selection can be made. If the user wishes to examine related items (links), for example Item 49 on FIG. 9, the adjacent arrow (902) is clicked. The computer then displays a View Items screen (not depicted) displaying all available information on Item 49. The user can then click the symbol (903) adjacent to the display of the name of Item 49 to display a pull-down list of all Items in the database, from which, if desired, a replacement for Item 49 can be selected. In a similar fashion, links are added to by clicking the symbol (902) where no item name is displayed. The View Items screen is similar to Edit dialog box (900), but does not provide the user the ability to edit the information on Item 49.

Clicking "Prev" button (904) calls up an Edit dialog box for the item displayed just above Item 3 on the View Query screen (FIG. 8). Clicking "Next" button (905) calls up an Edit dialog box for the item displayed just below Item 3 on the View Query screen. Clicking either "Next" or "Prev" results in the data on the screen being automatically saved prior to calling up the screen relating to the next or previous object. In addition, a "Save" button allows the user to save the data currently displayed. Thus, similar to flipping through a card file, starting at the top of a table and successively clicking "Next" button (905) allows the user to "flip" through a series of screens containing the information on each of the items comprising the table. As the user does such a review, a brief note can be attached to each item by clicking "Note" (906), and the attached note serves the function of a Post-It™ or tape-flag as discussed in connection with FIG. 6. On subsequent reviews of the items, the phrase "Note attached" appears for those items having notes, and an aural tone is sounded by the computer for each such item.

Figure 10:
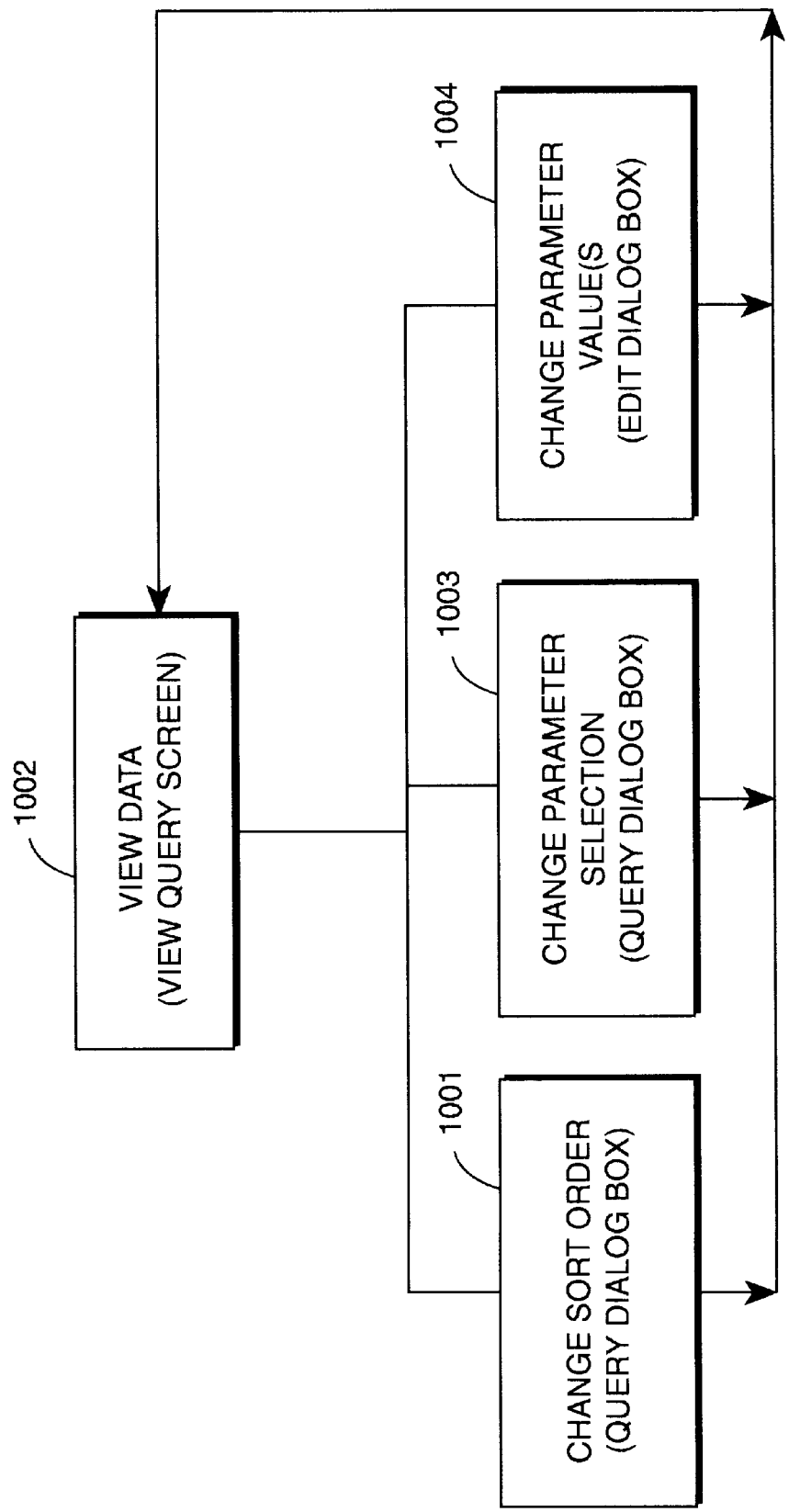
FIG. 10 is a flow diagram showing methods available to the user for modeling the display of text data objects.

Turning back to the View Query screen depicted in FIG. 8, it is evident that the display table is formatted in such a manner as to allow the user to study the parameter values in order to perceive relationships within the data or with other data in the user's mind. As the user views the table, there may arise a wish to manipulate, or model, the data on the table. In the preferred embodiment of the invention there are three ways, as depicted in FIG. 10, to model data presented on the View Query screen. First, the user can change the sort order (1001) and then view the same set of text data objects (1002), but from the perspective of a different sort order. In the embodiment depicted in FIG. 8, the user implements this modeling mode by clicking "Close" button (810) on the View Query screen), thereby calling up the Build Query dialog box of FIG. 7. On the Build Query dialog box, the user changes the sort order in the Sort dialog box (704), and then clicks on "View" to view the resultant table.

In an alternative preferred embodiment, the modeling of graphic images and audio files would be available, so the user can analyze not only relationships between the displayed values of text data objects but also images associated with those objects. On FIG. 6 another button similar to the "Expand" button (607) would read "Image" and clicking it would display a dialog box into which can be entered a graphic image or a list of associated graphic images. The size of the graphic images can be prescribed so that it is, for example, one-quarter screen size or one-sixth screen size. For controlled display of images during modeling, the View Query screen depicted in FIG. 8 would have an additional button named "Image" and clicking that button would cause the computer to display, for each text data object with a check mark in the "Mark?" column of FIG. 8, the graphic images associated with the text data object when the "Image" button on FIG. 6 was clicked. By means well known to programmers of Windows™ applications, the user would be able to either view either individual or multiple graphic images related to the marked text data objects on FIG. 8. The graphic images can also be displayed on a plurality of monitors separate from that used to display the table of text data objects. By means well known to programmers of Windows™ applications, the user would be able to click a graphic image and, if it is a three-dimensional image, rotate it to assess physical relationships with other displayed graphic images.

As depicted in FIG. 10, a second way of modeling the data is for the user to change the selection of parameters (1003), and then view the resultant new table (1002). Changing the parameters in this manner will result in a new table comprising a different set of items, but sorted in the same order as the items in the original table. The user implements this modeling method by returning to the Build Query dialog box (FIG. 7) by clicking "Close" button (810) as above, and there changing the parameters to be displayed by revising the "Select" criteria of Select dialog box (703). After revising the selected parameters, the user clicks "View" (715) to view the resultant table.

As depicted in FIG. 10, a third way to model the data is to change a parameter value (1004) for one or more item and view the resultant table (1002). In this manner, a user viewing the table can model the possibility that parameter values assigned to one or more text data objects may in fact be incorrect. For example, an archeologist hypothesizing that a particular item was a part of a pitcher rather than part of a cup could immediately check to see if making this change would cause the table of items to become more understandable or less understandable than previously. As another example, the archeologist examining the table in FIG. 11, which has been formatted to show only the pitchers among the items, could hypothesize that items 87 and 121, recovered from adjoining grids, are related. Physical examination of item 121, or an associated graphic image, could lead to a new conclusion that it is really more blue than brown. Highlighting the row corresponding to item 121 on the View Query screen, and either double-clicking or clicking "Edit" in the tool bar, signals the computer system to display an Edit dialog box for item 121. At this Edit dialog box, the user has the opportunity to change one or more parameter values for the selected item. There the color "blue" would be selected to replace the color "brown", and upon clicking Save, the table would reappear but with the Item 121 row moved up in the table directly underneath Item 87. If there were dozens of such conclusions, the archeologist would have identified a family of objects that can then be physically examined to determine if there was an actual physical relationship. Changing an item's parameter value may shift its location on the table, thereby causing the item and all its parameter values to move either up or down.

Therefore, in a preferred embodiment, the user studying a table is informed by a symbol in the "Links" column that other items have been previously categorized as related so that, for example, if a change in a parameter value is contemplated it is apparent that it is prudent to first examine the related item's parameter values.

Thus, FIGS. 8 and 11 depict displays that allow the user to personally, interactively, and immediately model the data in the context of other data in the computer and in the user's mind. In each case, using only two displays other than the table being viewed, the user has the ability to use his or her mind as the focal point for the analysis. This is in sharp contrast to the user reacting to a static table, perhaps designed by another person, or even several tables, that take time to prepare. The user can effectively model "what if" scenarios by changing a parameter value, studying the effect by viewing the table, FIG. 8 or FIG. 10, and cycling as desired. Similarly, tables can be shared between multiple users, who can then model them as their particular needs dictate, rather than being limited to viewing the data only from the perspective initially selected by the presenter.

Figure 13:
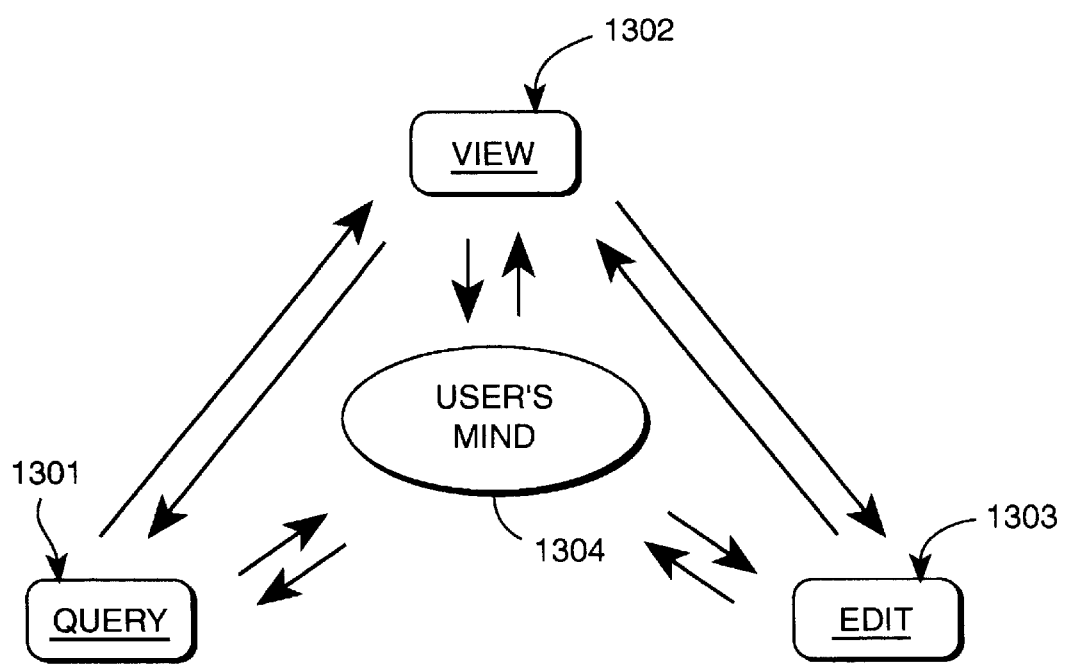
FIG. 13 is a flow diagram showing the interactions between and among a Build Query dialog box, a View Query screen, an Edit screen, and the user's mind in a preferred embodiment.

FIG. 13 depicts the interactions between the Build Query dialog box (1301), the resulting View screen (1302), the Edit dialog box (1303), and the mind of the user (1304). As depicted in FIG. 13, there is no limit to the number or order of steps that the user can take to analyze the data and ensure that it is presented in a useful way or ways. As depicted in FIG. 13, the user's mind plays a central role in the implementation of the invention. Thus, after viewing the result of a query or an edit of a text data object or objects, the user applies preexisting knowledge, intentions, intuition, and associational skills to the data in deciding whether the result is satisfactorily presented, or whether more can be learned from continued modeling.

In the preferred embodiment depicted, the columns of values of the six parameters can be displayed in 720 different arrangements. With 5 parameters the number of possible arrangements is 120, and with 4 parameters 24 arrangements are possible. Stored in the program is a numbered list of such arrangements. To illustrate, identify the 6 parameters by the letters A through F. The list would be constructed such as:

| Number | Parameter Order |
|--------|-----------------|
| 1 | A B C D E F |
| 2 | A C B D E F |
| 3 | A D C B E F and so on |
| 4 | A E C D B F |

Figure 12:
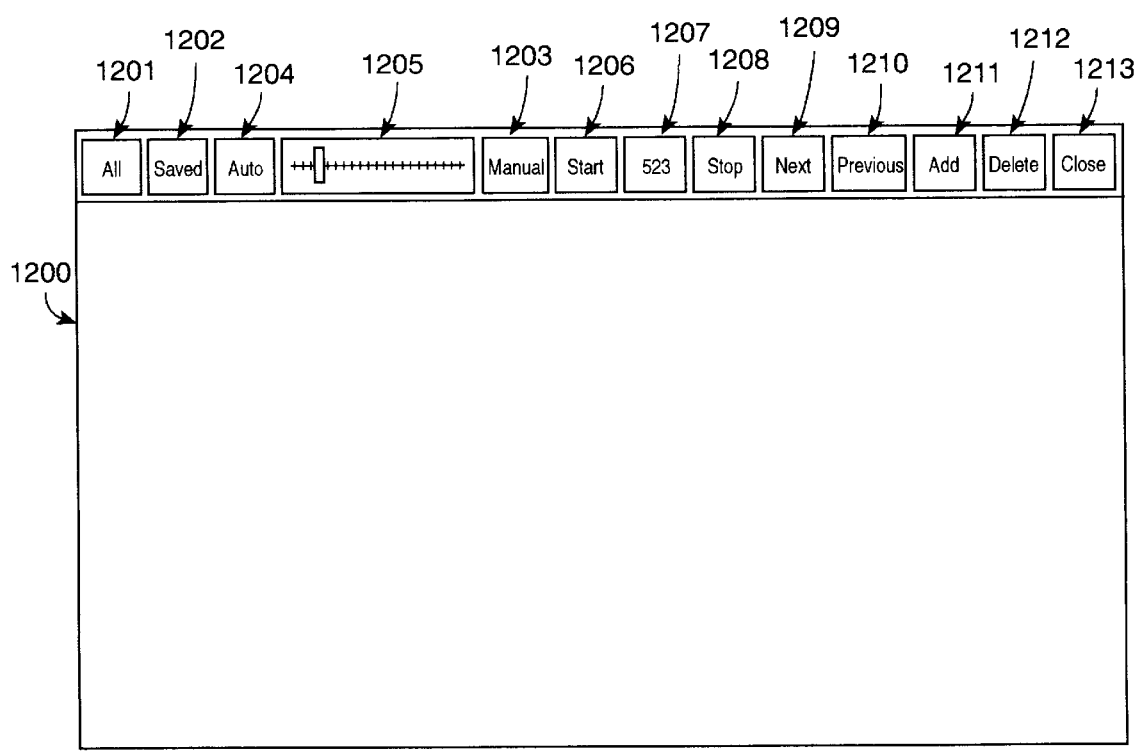
FIG. 12 is an illustration of a display screen that is used to control the automatic display of all possible tables of selected text data objects, each table with a different arrangement of the columns of parametric values of the text data objects.

To assist the user in viewing all possible displays, and in a rapid fashion so that the associative abilities of his/her mind is able to perceive relationships that have merit for further analysis, the tool bar depicted in FIG. 12 is provided.

In the preferred embodiment, the Build Query dialog box depicted in FIG. 7 would have an optional choice to the View button (715). It would be named "Cycle" and would cause the computer to display a table of text data objects that have been selected and sorted by the method displayed on FIG. 7. That table would be displayed in the dialog box (1200) on FIG. 12, and the user would model that display using the tool bar at the top of the screen. Clicking "All" (1201) would instruct the computer to prepare to process all text data objects. Clicking "Saved" (1202) would cause the display of a pull-down menu that lists arrangements of text data objects that were selected and arbitrarily named during previous use of the "Cycle" feature. From that pull-down menu the user choices the arrangement to be viewed. After choosing either "All" or a choice from "Saved," the user clicks "Manual" (1203) to cause the computer to display, one by one, the selected column arrangements of text data objects. Optionally the user can click "Auto" to cause the computer to display sequentially each of the selected arrangements of text data objects, with the intervals between displays controlled by the "Speed" bar (1205). After choosing either "Manual" or "Auto" the user initiates the display by clicking "Start" (1206). Adjacent to that button is a display (1207) of the number, in the embedded table of all possible column arrangements, of the arrangement currently being viewed. This, in FIG. 12, the table (not depicted) displayed below the toolbar is number 523 in the stored list of all possible arrangements of columns, Control of the "Auto" process is afforded by the "Stop" button (1208) that can then be overridden by again clicking "Start" (1206).

For manual operation the user clicks "Manual" (1203) and then instructs the computer to display the column arrangements previously chosen by clicking either "Next" (1209) or "Prev" (1210), or previous, allowing roaming back and forth to examine available displays.

In an alternative preferred embodiment, the "Cycle" mode of operation would provide, as an option to viewing the table depicted on FIG. 8 the user would be able to view their related graphic images, using means well familiar to programmers and users of Windows™ technology.

In both the "Auto" and "Manual" modes of operation the user can click "Add" to record the number of the currently viewed column arrangement, in a temporary file that can later be saved. If a "Saved" set of column arrangements is in use, the user can click "Delete" to remove the viewed arrangement from the set then in use. When the user clicks "Stop" (1308) the computer reverts to the "Manual" mode, and the user can then either continue in that mode, using the "Prev" and "Next" buttons to control the display or choose the "Auto" mode.

The process depicted in FIG. 2 is depicted in a different fashion in FIG. 13 to illustrate that the user's mind (1304) is indeed the primary data processor. After constructing a query (1301) and viewing the resulting table (1302), the user is able to model that table by, as many time as desired and with only one click each, revising the query (1301) and/or editing (1303) text data objects. The user's knowledge, intuition, and associative skills become central to the analytic process as he or she models the table to extract from it all possible information.

In a further preferred embodiment, the computer system may be signaled to execute selected commands by pressing appropriate keys on a keyboard communicating with the computer system. For example, icons may be highlighted in turn by repeated pressing of the "Tab" key or the "Control" and "Tab" keys on the keyboard simultaneously, and the computer system could be signaled to execute the function represented by the highlighted icon by pressing the "Enter" or "Return" key on the keyboard. Similarly, selected menu bar entries and other command names displayed in text by the computer system may include a letter that is highlighted or underscored. In the case of a command, pressing the key on the keyboard for the underscored or highlighted letter signals the computer system to execute that command. In the case of a menu bar item, pressing signals the computer system to display a pull-down menu with a list of entries and command names corresponding to selected icons. Through the use of well-known techniques, including using keyboard arrow keys to highlight a selected entry or command and pressing the "Enter" key, a user may also signal the computer to execute a selected command or the display a selected entry.

It will be apparent to those skilled in the art that the invention described herein is not limited to the specific preferred embodiments discussed above. For example, although the above discussion describes a program using a mouse device on a Windows™ platform, those skilled in the art will recognize that the invention could also be practiced with input devices such as trackballs, joysticks, light pens, and the like, and could also be usefully implemented on platforms such as Macintosh, X-Windows, Motif, NextStep, OS/2, and the like. It will also be apparent to those skilled in the art that various modifications can be made to this invention of a computer-implemented method for sorting and displaying text data objects without departing from the scope or spirit of the invention. It will be apparent to those skilled in the art that various modifications and variations of the method for sorting and displaying text data objects, provided they come within the scope of the appended claims and their equivalents.

What is claimed is:

1. A method for using a computer system to rapidly display a series of lists of selected text data objects, wherein each object has a plurality of parameters, comprising:

a. selecting said text data objects;

b. generating, in response to a single user request, a series of lists of the selected text data objects sorted according to all possible permutations based on said parameters;

c. sequentially imaging a plurality of pages of said sorted series of lists of the selected text data objects based on one of image options comprising:

imaging option wherein the time intervals between the sequential imaging of said pages is based on a speed specified by the user, and imaging option wherein the intervals between the sequential imaging of said pages is based on a manual request by the user.

2. The method of claim 1 further comprising:

d. designating during the sequential imaging of lists sorted according to all possible permutations those permutations for which sort criteria are stored and named as an entry in a list of selected permutations;

e. selecting from said list of selected permutations those to be used for generating and displaying a series of lists of selected text data objects.

3. The method of claim 1 further comprising:

f. imaging simultaneously a plurality of graphic images associated with the selected text data objects, wherein said imaging comprises all graphic images associated with the totality of text data objects in the sorted list of said objects, or wherein said imaging comprises graphic images associated with text data objects designated by the user, and wherein the ordering of said images is based on the ordering of text data objects, and wherein the size and location of said imaging, on a display device or a plurality of said devices, is based on a manual request by the user.

\* \* \* \* \*